United States Patent
Chenillo et al.

(10) Patent No.: US 10,096,169 B1
(45) Date of Patent: Oct. 9, 2018

(54) SYSTEM FOR THE AUGMENTED ASSESSMENT OF VIRTUAL INSERTION OPPORTUNITIES

(71) Applicants: Samuel Chenillo, New York, NY (US); Oren Steinfeld, Kfar Saba (IL)

(72) Inventors: Samuel Chenillo, New York, NY (US); Oren Steinfeld, Kfar Saba (IL)

(*) Notice: Subject to any disclaimer, the term of this patent is extended or adjusted under 35 U.S.C. 154(b) by 0 days.

(21) Appl. No.: 15/852,389

(22) Filed: Dec. 22, 2017

Related U.S. Application Data

(60) Provisional application No. 62/507,549, filed on May 17, 2017, provisional application No. 62/608,666, filed on Dec. 21, 2017.

(51) Int. Cl.
| | |
|---|---|
| *G06T 19/00* | (2011.01) |
| *G06F 15/18* | (2006.01) |
| *H04N 5/272* | (2006.01) |
| *G06F 17/30* | (2006.01) |
| *H04L 29/06* | (2006.01) |
| *G06T 19/20* | (2011.01) |

(52) U.S. Cl.
CPC ............ *G06T 19/006* (2013.01); *G06F 15/18* (2013.01); *G06F 17/30598* (2013.01); *G06T 19/20* (2013.01); *H04L 65/602* (2013.01); *H04N 5/2723* (2013.01)

(58) Field of Classification Search
CPC ....... G06T 19/006; G06T 19/20; G06F 15/18; G06F 17/30598; H04L 65/602; H04N 5/2723
See application file for complete search history.

(56) References Cited

U.S. PATENT DOCUMENTS

| | | | |
|---|---|---|---|
| 7,444,659 B2 * | 10/2008 | Lemmons | .......... H04N 7/17318 375/E7.006 |
| 9,351,032 B2 | 5/2016 | Briggs | |
| 9,584,736 B2 | 2/2017 | Desgoande | |
| 9,621,929 B1 | 4/2017 | Chenillo | |

* cited by examiner

*Primary Examiner* — Hunter B Lonsberry
(74) *Attorney, Agent, or Firm* — r.r (princeton); Roy Rosser

(57) ABSTRACT

A system for the augmented assessment of digital media streams for virtual less than insertion opportunities is disclosed. A digital media stream is automatically decomposed, using a programmed digital processor, into one or more candidate-clips have a predetermined minimum length, and no internal shot transitions. These candidate-clips are then examined, and the ones deemed suitable for virtual insertion use, are classified as viable-clips and stored in a digital database. The artificial intelligence techniques of machine learning and deep learning are then used to further classify the viable-clips according to their virtual insertion related attributes that may be attractive to advertisers, such as scene context, emotional tone and contained characters. A value is then assigned to the viable-clips, dependent on their insertion related attributes, and the overlap of those attributes with client requested requirements.

16 Claims, 4 Drawing Sheets

US 10,096,169 B1

SYSTEM FOR THE AUGMENTED ASSESSMENT OF VIRTUAL INSERTION OPPORTUNITIES

CROSS-REFERENCE TO RELATED APPLICATIONS

This application claims priority to U.S. Provisional Patent Application No. 62/509,744 filed on Dec. 21, 2017 by Chenillo et al. entitled "Augmented Virtual Video Insertion", and to U.S. Provisional Patent Application No. 62/507,549 filed on May 17, 2017 by Chenillo et al. entitled "Augmented Virtual Video Insertion", the contents of both of which are fully incorporated herein by reference.

BACKGROUND OF THE INVENTION (1) Field of the Invention

The invention relates to systems and methods for augmenting the assessment of virtual image insertion opportunities in media streams, and more particularly to the use of artificial intelligence techniques, such as machine learning and deep learning, to augment and automate part, or all, of such assessments.

(2) Description of the Related Art

The technical problem of assessing media streams for virtual insertion opportunities arises in the technical fields of television broadcasting and video content distribution.

Virtual insertion of images, including images representing objects, into media streams such as, but not limited to, television broadcasts, has become possible through the use of digital pattern recognition and match moving technology. It is used, for instance, in live broadcasts of television sporting events to both insert graphics, such as the virtual $1^{st}$ and 10 line in football, and to insert advertising, such as banners behind the batter in televised baseball games.

The technology has also been used to place banners and objects in recorded television shows. There are libraries of many hundreds of hours of recorded television shows that are used for re-broadcasts, or distributed via streaming services as on-demand content. This large quantity of recorded video content represents a significant potential opportunity for generating revenue by virtual image insertion for product placement or advertising. A difficulty, however, is the enormously labor intensive task of reviewing the content to find suitable locations for the virtual insertions. What is needed is a system and method that can augment, or completely automate, this task of assessing video images for the assessment of virtual insertion opportunities.

The relevant prior art includes:

U.S. Pat. No. 9,621,929 issued to Chenillo et al. on Apr. 11, 2017 entitled "Method of video content selection and display" that describes a method of automated content selection in which an end user views multimedia content provided via by a content aggregator that is also programmed to detect content delivery boundaries. This occurs, for instance, when the provider switches from showing an event to showing interstitial advertising. On detecting a delivery boundary, a substitute stream of multimedia content is then automatically sent. Detecting a content delivery boundary is accomplished in a twostep process. First, a candidate frame indicative of a deliver boundary is found. This is done, for instance, by finding a change in average sound volume of sufficient magnitude. The candidate frame is then compared to a database of representative frames of known interstitial video segments. If a sufficiently good match is found, the frame is determined to be a content boundary frame, and appropriate switching of the video being relayed is made.

U.S. Pat. No. 9,351,032 issued to Briggs et al. on May 24, 2016 entitled "Interactive product placement system and method therefor" that describes a method for presenting advertisements for commercial products in video productions, whereby the commercial product is placed in the video production as an element of the video production. A viewer is enabled to interact with the video production to select the product. Information is then displayed about the selected product; and the viewer is enabled to purchase the selected product.

U.S. Pat. No. 9,584,736 issued to Deshpande et al. on Feb. 28, 2017 entitled "Automatic repositioning of video elements" that describes a system and method for automatically repositioning virtual and physical elements in a scene. The system and method being configured to receive a video frame, receive data, including position data, describing a first element to be imaged in the video frame, receive data, including position data, describing a second element to be imaged in the video frame, assign a dynamic status to the first element and automatically reposition at least the first element to create a modified video frame.

Various implementations are known in the art, but fail to address all of the problems solved by the invention described herein. Various embodiments of this invention are illustrated in the accompanying drawings and will be described in more detail herein below.

BRIEF SUMMARY OF THE INVENTION

An inventive system and method for the augmented assessment of digital media streams for virtual image insertion opportunities is disclosed.

Augmenting, or even entirely automating, the process of reviewing digital media streams to locate suitable places for the virtual insertion of images may be a way to offer advertisers cost effective virtual insertion opportunities. Such advertisers may, for instance, obtain virtual insertion opportunities, tailored to their requirements, in already recorded television shows and other video material such as, but not limited to, social media video clips.

In a preferred embodiment, such a system may first automatically decompose a digital media stream into one or more candidate-clips. The candidate-clips may, for instance, be a contiguous portion of a digital media stream having a video component with a duration longer than a predetermined minimum number of digital video images, and in which there is no internal shot transitions. This may, for instance, be accomplished automatically using a suitably programed digital computation device. For instance, the requirements may be that the candidate-clip contain at least thirty images, i.e., roughly one second of video when displayed at conventional television speeds, and have no internal shot transitions. Shot transitions may, for instance, be determined by examining the sum of the pixel values in an image and looking for a change beyond a certain minimum in consecutive images. The candidate-clips may then be stored in a suitable digital memory.

The system may then automatically examine candidate-clips to see if they are viable-clips, i.e., clips that may be effectively used for placing virtual insertions. A minimum requirement may, for instance, be that the images in the clip contain a contiguous region, having predetermined minimum area, in which all the pixels have a similar color value. For instance, such a viable insertion region may need to have an area that is 5% or more of the area of the image, and the pixel color values within that region may need to be within +/−1% of a mean color value of the pixels. The color uniformity may, for instance, allow chromo-color techniques to be implemented should foreground objects occlude the region at some point in the clip. The viable-clips, preferably tagged with coordinates indicative of a geometric location of the viable insertion regions, may then be stored in a viable-clip database on a suitable digital storage device.

In a further step, the viable-clips may then be examined further to ascertain their virtual insertion related attributes. Such attributes may be of relevance to potential advertisers and may, for instance, include factors such as, but not limited to, a perspective perceived, surface orientation of the viable insertion region, a scene context, an emotional tone of the viable-clip, or a contained character, or some combination thereof.

A scene context may be one of a variety of factors such as, but not limited to, whether the scene is an indoor scene, an outdoor scene, a daylight scene, or a night scene, or whether it is shot in a particular location or room, and may even be as granular as whether the scene contains particular objects.

Viable-clips may be automatically sorted into such categories using the artificial intelligence techniques of machine learning and deep learning. A machine learning system may, for instance, be trained on a database of video images that have been sorted by a human into groups representative of the required scene contexts. The trained machine learning system may then be used to automatically, and efficiently, determine a scene context of the viable-clips with a high degree of confidence.

In a similar way, an emotional tone of a scene may be recognized from the sound tracks, or audio clips associated with the viable-clips. The emotional tone may, for instance, relate to factors such as, but not limited to, whether the scene represents a high intensity moment, a suspenseful moment, a surprising moment, a fearful moment, a cathartic moment, a joyful moment, or a sad moment, or some combination thereof.

By first building a reference data base of audio clips that have been sorted by humans into the required categories of emotional tones, a machine learning system may then be trained to automatically, and efficiently, do the sorting of the viable-clips, with their associated audio clips, into the required categories with a high degree of accuracy. In a similar way, characters in clips may be recognized.

In a further embodiment of the invention, the viable-clips and their associated virtual insertion related attributes may be automatically valued. They may, for instance, be assigned a potential value based on, for instance, measuring features such as the area of the virtual insertion regions and the duration of the clips containing them, and combining them to form a single number indicative of the impact the virtual insertion may have. The potential value may be refined by, for instance, assigning numerical weighting factors to the various virtual insertion related attributes and combining these with the number obtained from the area and duration.

The viable-clips may also, or instead, be assigned a market value. This may, for instance, be accomplished by obtaining a list of required criteria from a client, and then automatically calculating an overlap, or correspondence, between the required criteria and the virtual insertion related attributes of the viable clips.

Therefore, the present invention succeeds in conferring the following, and others not mentioned, desirable and useful benefits and objectives.

It is an object of the present invention to provide a quick and cost effective way to augment, and even fully automate, the assessment of video streams for virtual image insertion opportunities.

It is another object of the present invention to provide a quick and cost effective way to categorize virtual insertion opportunities by attributes of the scene in which they occur.

Yet another object of the present invention is to provide a quick, cost effective and accurate way to value virtual insertion opportunities.

DETAILED DESCRIPTION OF THE INVENTION

Figure 1:
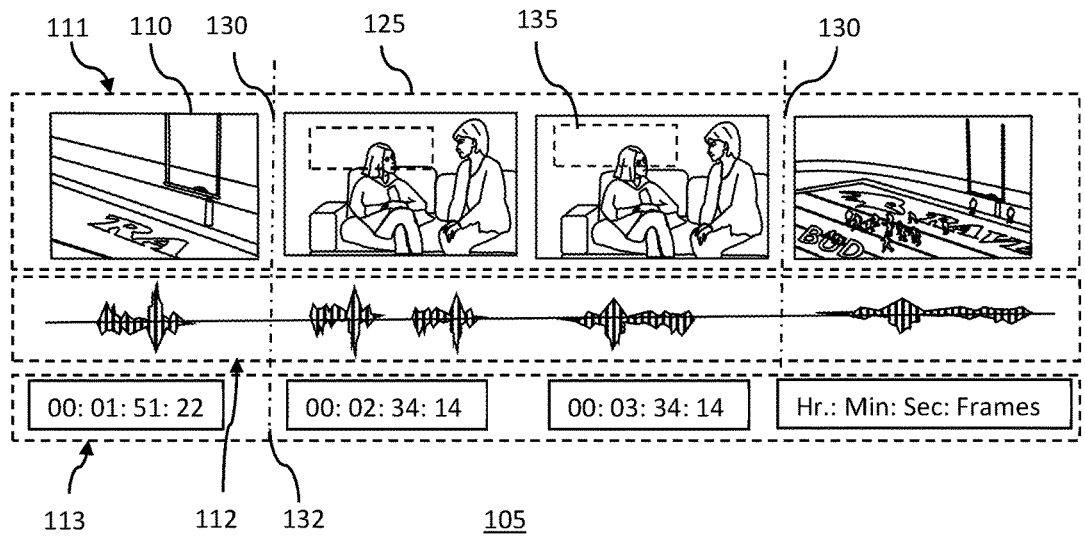
FIG. 1 shows a schematic representation of a digital media stream.

The preferred embodiments of the present invention will now be described in more detail with reference to the drawings in which identical elements in the various figures are, as far as possible, identified with the same reference numerals. These embodiments are provided by way of explanation of the present invention, which is not, however, intended to be limited thereto. Those of ordinary skill in the art may appreciate upon reading the present specification and viewing the present drawings that various modifications and variations may be made thereto without departing from the spirit of the invention.

FIG. 1 shows a schematic representation of a digital media stream 105.

The digital media stream 105 typically consists of a video track 111, an audio track 112 and a time track 113. The video track 111 typically has a number of digital video images 110. A typical digital media stream 105 may be a string of scenes separated by scene cuts 132. Within the scenes, the images change gradually as the action within the scene unfolds. However, at the scene cut there is typically a marked change in the images over a very short number of images. These shot transitions 130 may be used to partition a digital media stream 105 into portions, or candidate-clips 125. If these candidate-clips 125 contain a string of similar images, with no internal shot transitions 130, and are of sufficient duration, they may be usefully examined for viable insertion regions 135. A viable insertion region 135 may, for instance, be a region of the image where a virtual image may be substituted such that the virtual image is impactful without interfering with the action occurring in the scene. One type of a viable insertion region 135 may have a reasonably uniform color over a reasonably sized area. The color uniformity may, for instance, allow chromo-color techniques to be implemented to maintain an appearance of the inserted image to be actually in the scene should foreground objects occlude some or all the region at some point in the clip.

Figure 2:
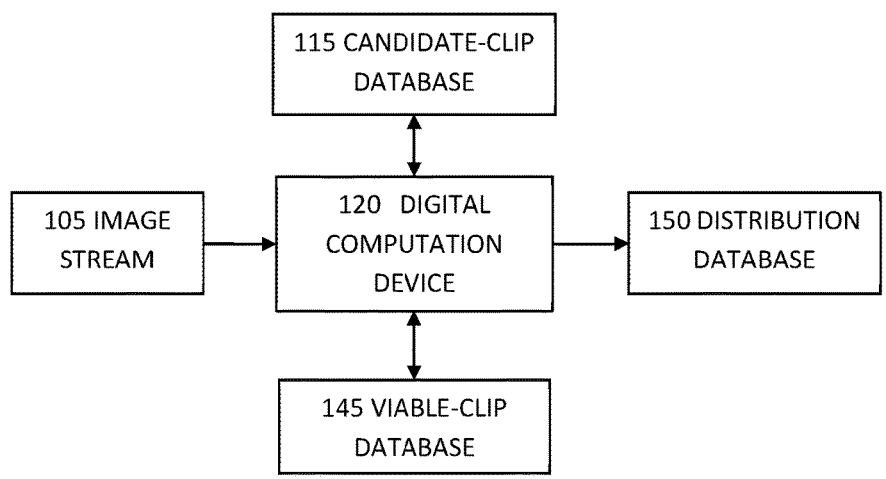
FIG. 2 shows a schematic representation of a system for the augmented assessment of video streams for virtual image insertion opportunities of one embodiment of the present invention.

FIG. 2 shows a schematic representation of a system for the augmented assessment of video streams for virtual image insertion opportunities of one embodiment of the present invention.

The system for augmented assessment of video streams for virtual image insertion opportunities 100 may include a digital computation device 120. This may, for instance, be any suitably programmed digital processor and associated digital memory. All or part of the system may reside on the cloud. The digital computation device 120 may receive one or more digital media streams 105 that it may then process to automatically obtain candidate-clips 125 that may be stored in a candidate-clip database 115. As described above, the candidate-clips may be segments of the digital media stream 105 that are sufficiently long to be of interest for the purposes of commercial advertising, and have no internal transitions. Clips that are less than 30 images long may, for instance, not be considered candidate-clips as such a clip may only be displayed for about 1 second on a standard video display. This may be considered too short a time for a virtual ad placed in it to make sufficient impact on a viewer, i.e., insufficient impact for an advertiser to pay a reasonable price for the labor of performing the virtual insertion.

A human may access the candidate-clips from database 115 and assess them for their use in virtual advertising by looking for viable insertion regions. Or this process may be partially or fully automated. The digital computation device 120 may, for instance, access the candidate-clips from the candidate-clip database 115 and automatically process them to determine if they contain viable insertion regions, i.e., clips that may be used to place virtual insertions. A minimum requirement for viable insertion regions may, for instance, be that the images in the clip contain a contiguous region, having predetermined minimum area, in which all the pixels have a similar color value. For instance, such a viable insertion region may need to have an area that is 5% or more of the area of the image, and the pixel color values within that region may need to be within +/−1% of a mean color value of the pixels. The viable-clips, preferably tagged with coordinates indicative of a geometric location and a shape of the viable insertion regions, may then be stored in viable-clip database 145, that may be a suitable digital storage device, located either locally or remotely on the cloud.

In a further step, the viable-clips may be taken from the viable-clip database 145 and examined further to ascertain their virtual insertion related attributes. Such attributes may, for instance, include factors such as, but not limited to, a perspective perceived, surface orientation of the viable insertion region, a scene context or an emotional tone of the viable-clip, or some combination thereof.

A scene context may be one of a variety of factors such as, but not limited to, whether the scene is an indoor scene, an outdoor scene, a daylight scene, or a night scene, or whether it is shot in a particular location or room, and may even be as granular as whether the scene contains particular objects.

This further examination and sorting into categories may be done by a human, or it may be done partly, or fully, automatically using, for instance, some of the artificial intelligence techniques of machine learning and deep learning. The digital computation device 120 may, for instance, be programmed to incorporate a machine learning system that may have been trained on a database of video images that have been sorted by a human into groups representative of the required scene contexts. The trained machine learning system may then be used to automatically, and efficiently, determine a scene context of the viable-clips with a high degree of confidence.

In a similar way, an emotional tone of a scene may be recognized from the sound tracks, or audio clips associated with the viable-clips. The emotional tone may, for instance, relate to factors such as, but not limited to, whether the scene represents a high intensity moment, a suspenseful moment, a surprising moment, a fearful moment, a cathartic moment, a joyful moment, or a sad moment, or some combination thereof.

Sorting the viable-clips into categories based on their emotional tone may be done by humans, or it may be partly, or completely, automated using some of the artificial intelligence techniques of machine learning and deep learning.

For instance, by first building a reference data base of audio clips that have been sorted by humans into the required categories of emotional tones, a machine learning system may then be trained to automatically, and efficiently, sort the viable-clips, with their associated audio clips, into the required categories, with a high degree of accuracy. In a similar way, characters in clips may be recognized, categorized and stored.

The virtual insertion related attributes may be stored as tags along with the viable-clips they are associated with in the viable-clip database 145, or they may be stored in separate databases and referenced to their associated clips.

Selected viable-clips may also, or instead, be stored in a distribution database 150 before, or after, being sent for further processing, such as, but not limited to, the insertion of actual virtual images.

Figure 3A:
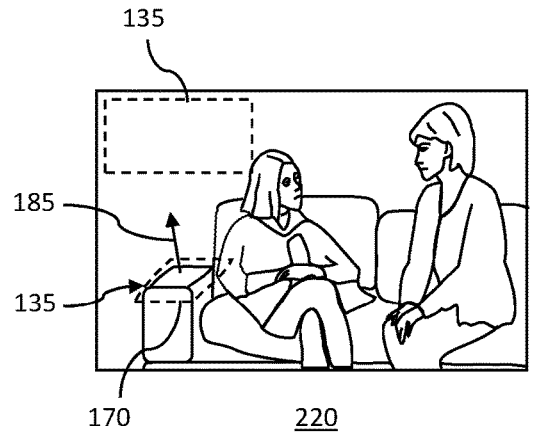
FIG. 3A shows a schematic representation of a video scene.

FIG. 3A shows a schematic representation of a video scene 220 in which two viable insertion regions 135 have been identified. The one viable insertion region 135 is a flat region on a wall behind the actors. The other viable insertion region 135 is an arm-rest surface of a sofa on which the actors are seated. The arm-rest viable insertion region 135 has been characterized by its detected edges 170 and a normal vector 185. The detected edges 170 may, for instance, be used to define a perspective perceived, plane of the viable insertion region that may be used to calculate the normal vector 185, that may be a be normal to the perspective perceived, plane.

Figure 3B:
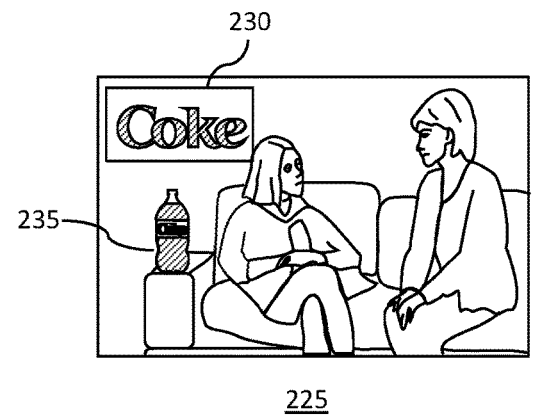
FIG. 3B shows a schematic representation of a video scene with virtual insertions.

FIG. 3B shows a schematic representation of a video scene 225 with virtual insertions. As shown in FIG. 3B, a flat, virtually inserted graphic 230 has been inserted in the flat viable insertion region on the wall behind the actors. A virtually inserted image representing a 3D object 235 has been inserted in the viable insertion region on the arm-rest of the sofa. The normal vector indicating the perspective perceived, plane of the insertion region may have been used to correctly orient and position the virtually inserted object 235.

Figure 4:
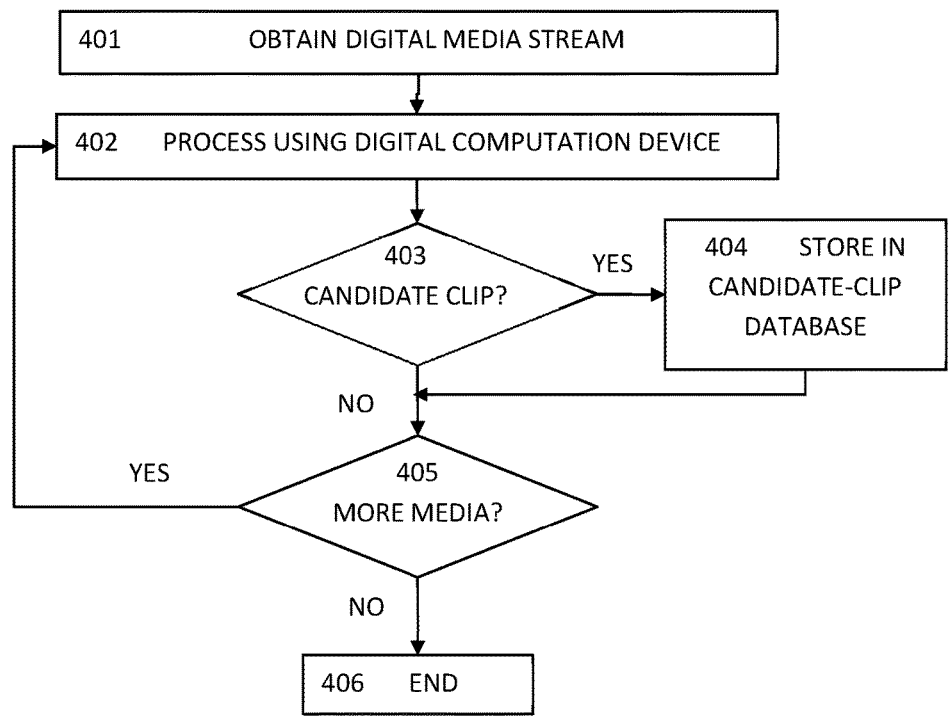
FIG. 4 shows a schematic flow-diagram of representative steps in automatically obtaining candidate-clips of one embodiment of the present invention.

FIG. 4 shows a schematic flow-diagram of representative steps in automatically obtaining candidate-clips of one embodiment of the present invention.

In Step 401 "OBTAIN DIGITAL MEDIA STREAM", digital media may be supplied to a suitably programmed digital processor. The digital media may originate from a remote site such as, but not limited to, a social media site, or it may be live-streamed to the processor, or it may have been stored on a database that may be local to, or remote from the programmed digital processor.

In Step 402 "PROCESS USING DIGITAL COMPUTATION DEVICE", the programmed digital processor may analyze the digital media looking for suitable candidate-clips, i.e., for sections of the digital media that may be suitable for the insertion of virtual images. Depending on the intended purpose of the virtual insertions, there may be different criteria for determining what are candidate-clips. For instance, if the virtual insertion may be used for advertising, or brand messaging, the criteria may include a certain minimum length of clip. The criteria may, for instance, be that to be considered a candidate clip, it must have at least 30 successive images without a scene cut. One method of automatically detecting such scene cuts, or scene transitions, may be to look for changes of 5% or more in a sum of image pixel values between consecutive digital video images. Other methods of detecting scene transitions may include examining the audio track or the time track, as described in detail in U.S. Pat. No. 9,62,1929 issued to Chenillo et al. on Apr. 11, 2017 entitled "Method of Video Content Selection and Display", the contents of which are hereby incorporated by reference in their entirety.

In Step 403 "CANDIDATE CLIP?" a determination may be made as to whether a candidate-clip has been found. If it has, then the system may proceed to Step 404 "STORE IN CANDIDATE-CLIP DATABASE", in which the candidate-clip may be stored in a digital database that may be local to, or remote from, the digital processor making the determination.

If a candidate-clip is not located, the system may proceed to Step 405 "MORE MEDIA?" in which the program may check if there is any more of the digital media stream to process. If there is, the system may revert to Step 402 and continue processing the digital media stream. If not, the system may end in Step 406 "END".

Figure 5:
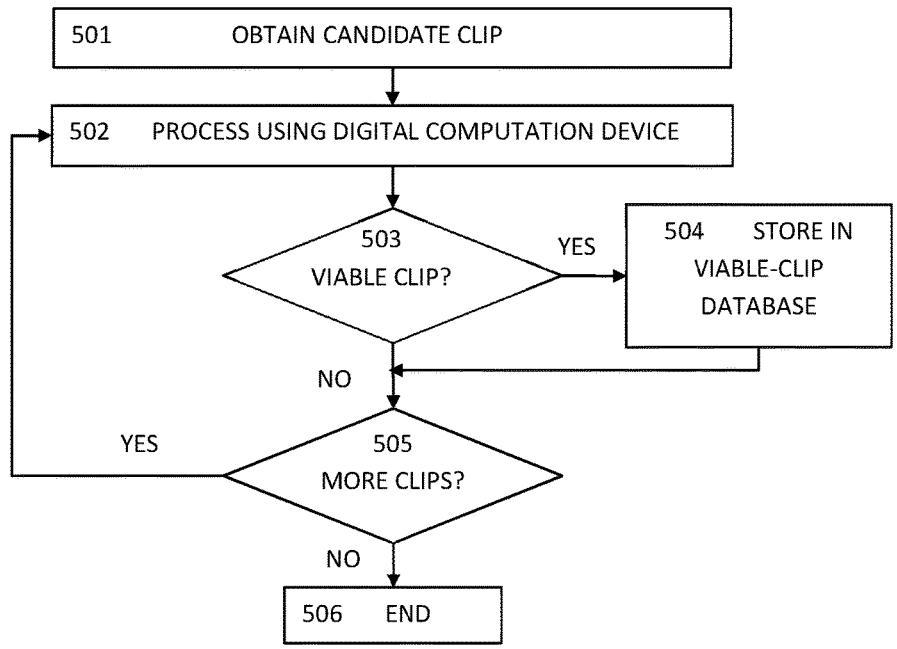
FIG. 5 shows a schematic flow-diagram of representative steps in automatically obtaining viable-clips of one embodiment of the present invention.

FIG. 5 shows a schematic flow-diagram of representative steps in automatically obtaining viable-clips of one embodiment of the present invention.

In Step 501 "OBTAIN CANDIDATE CLIP", the system operating on the digital processor may obtain a candidate-clip from the candidate-clip database.

In Step 502 "PROCESS USING DIGITAL COMPUTATION DEVICE", the system may automatically examine the candidate-clip to see if it may be a viable-clip, i.e., a clip in which a virtual image insertion may be usefully placed.

A viable insertion region may, for instance, be a region in the video images of the candidate clips that may be used for the virtual insertion of an image.

One type of region that may be considered a viable region, and that may be automatically located using standard image processing techniques, is a contiguous region of a predetermined minimum area in which all the pixels have a pixel color value within a predetermined range. The color uniformity may, for instance, allow chromo-color techniques to be implemented to maintain an appearance that the inserted image is actually in the scene should foreground objects occlude some or all the region at some point in the clip.

For instance, a viable region may be one in which all the color values are within +/−1% of a mean color value of all the pixels in the region, and the region has an area that is greater than or equal to 5% of a total area of said digital video image.

There may be additional constraints on what constitutes viability, including factors such as, but not limited to, the geometric shape of the region, i.e., that the region be square, or it be rectangular with an aspect ratio of, for instance, less than 4 to 1, or less than 2 to 1, or that the region remains unoccluded by foreground objects for the duration of the candidate clip, or some combination thereof.

The may also be instances when having a uniform color may be unimportant, and a suitably sized geometric area that remains unoccluded throughout the candidate clip may be the criteria for viability. For instance, a viable clip may be one in which at least one of the images has an unoccluded region that is rectangular in shape, has an area greater that than 5% of the total area of the clip image, and in which the rectangle has an aspect ratio less than 4:1.

If, in Step 503 "VIABLE CLIP?" the system detects a candidate clip deemed to have one or more viable insertions regions, the system may proceed to Step 504 "STORE IN VIABLE-CLIP DATABASE", and store the clip in a viable-clip database along with any relevant information such as, but not limited to, coordinates indicative of the viable regions area and shape, or the mean color value of the viable region, or whether it is occluded by foreground objects, or some combination thereof.

The system may then proceed to Step 505 "MORE CLIPS?" in which the system may determine if there are any further candidate-clips to be examined for viable insertion regions. If there are no more candidate-clips required to be examined, the system may proceed to Step 506 "END" and terminate operation.

Figure 6:
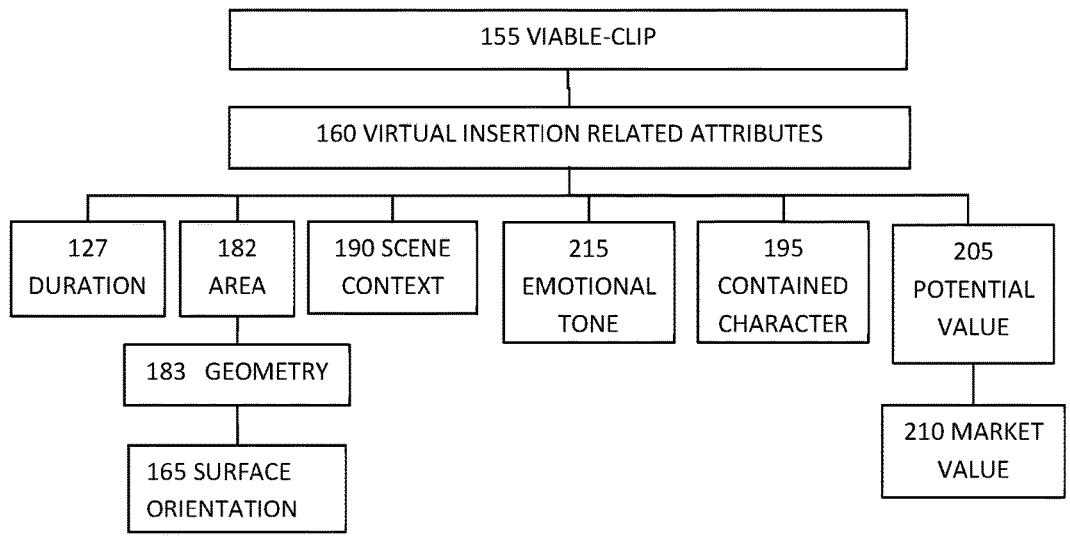
FIG. 6 shows a schematic representation of the virtual insertion related attributes associated with a viable-clip.

FIG. 6 shows a schematic representation of the virtual insertion related attributes that may be associated with a viable-clip.

As shown in FIG. 6, there may be a range of virtual insertion related attributes 160 that may be associated with a viable-clip 155 and which may be of relevance to the clips use in virtual insertion. The virtual insertion related attributes 160 of the viable insertion regions may, for instance, take the form of properties such as, but not limited to, a duration 127, an area 182, a geometry 183, a perspective perceived, surface orientation 165, a scene context 190, an emotional tone 215, contained characters 195, a potential value 205 and market value 210, or some combination thereof.

The duration 127 of the viable insertion region 135 may, for instance, be measured in seconds, or as a number of frames or images in the clip, or some combination thereof.

The area 182 of the viable insertion region 135 may, for instance, be measured as a percentage of the total image, or as a number of pixels, or some combination thereof.

The geometry 183 of the viable insertion region 135 may simply be expressed as coordinates within the digital image that may define the edges of the region, the periphery of the region, or vertices such as, but not limited to, the corner points of a rectangle, or a quadrilateral, or some combination thereof.

The perspective perceived, surface orientation 165 may, for instance, relate to a quadrilateral shaped insertion region, and be related to determining what size and orientation a rectangle would have to be to appear as such a quadrilateral. The perspective perceived, surface orientation 165 may for instance be expressed as a normal to a perspective perceived plane formed by the edges of such a quadrilateral. The perspective perceived, surface orientation 165 may, therefore, be obtained by, for instance, automatically obtaining one or more edges of the viable insertion region using standard image processing techniques. These edges may then be used to automatically define a perspective perceived plane of the viable insertion region. The viable insertion region may appear as a two-dimension object in the image, and, in the case of a quadrilateral, may have four corner points, each having, for instance, an x and a y image referenced coordinate. The perspective perceived plane may, therefore, be considered to be that same region, but with imaginary z coordinates, such that an imaginary 3D rectangle defined by the 3D coordinates, would appear as the quadrilateral in the image.

In the instance of a quadrilateral representing a rectangle, the z coordinates may be obtained by, for instance, knowing that the opposite sides of the represented object have to be equal in length in 3D space, thereby providing two equations. The knowledge that the diagonals of the represented object also have to be equal in 3D space provides a further equation. With those three equations, and by setting one of the vertices of the rectangle to have z=0, z values may be obtained for the remaining three vertices as there is always an exact solution to three independent equations having three unknowns.

Having obtained the coordinates of the imaginary rectangle, a 3D perspective perceived plane in which the rectangle lies may be defined. This plane may then be used to define a vector normal to it that may be used as a measure of the perspective perceived, surface orientation.

That normal vector may effectively be the perspective perceived, surface orientation 165 and may, for instance, be used to create a pose, or orientation, of a 3D object that may be represented in an image that may be virtually inserted into the viable insertion region.

The scene context 190 may be a category representing attributes such as, but not limited to, a scene's physical or geographical location, time of day, season of the year, or some combination thereof. The physical location may range from more general categorizations such as, for instance, indoor, outdoor, city, countryside, beach, or some combination thereof, or it may be as specific as a room type such as, but not limited to, a living room scene, a kitchen scene, a bathroom scene, a bedroom scene, an office scene, a restaurant scene, a bar scene, or some combination thereof.

The scene context 190 may be of significance for companies or people wishing to promote a brand or product that may require a particular association.

The emotional tone 215 may be a category representing a sensation conveyed by the scene such as, but not limited to, a high intensity moment, a suspenseful moment, a surprising moment, a fearful moment, a cathartic moment, a joyful moment, or a sad moment, or some combination thereof.

The contained character 195 attribute may be a general category representing characters contained in the viable-clip such as, but not limited to, an adult, a teenager, a child, a male, a female, a type of pet or animal, a cartoon character or some combination thereof. The contained character 195 may also, or instead, be a specific category such as, but not limited to, a specific person, or a specific character, as in a specific role character, or a specific fictional character. For instance, a contained character attribute may be Spider-Man, or it may be Tobey Maguire, or it might be Tobey Maguire playing Spider-Man.

The potential value 205 of a viable-clip 155 may, for instance, be a single number based on a formula or algorithm that may factor in such automatically determined attributes of the viable insertion regions such as, but not limited to, its absolute area, or area relative to the size of the image it appears in, its duration measured in seconds or in a number of images, or some combination thereof. For instance, a potential value may be the number obtained by multiplying the length of the viable clip by the viable regions area as a percentage of the image, so that a five-second-long clip with a viable region having a 5% area may have a potential value of 0.25. This number may then be used to rank virtual insertion opportunities.

A more sophisticated valuation of viable-clips may also, or instead, factor in other virtual insertion related attributes 160 by, for instance, assigning numerical weighting factors to one or more of those attributes. For instance, it may be determined that the impact of an indoor scene is twice that of an outdoor scene. The potential value of viable-clips may, therefore, be adjusted by multiplying them by 2 if they are indoor scenes, but leaving them unadjusted—effectively multiplying by 1—if they are outdoor scenes.

The market value 210 of a viable-clips 155 may be a number, or it may be a dollar amount that may be representative of a price a client may pay to have a virtual insertion placed in a particular viable-clip, or group of viable clips. Clients may be considered as a group, or as individuals. For instance, as a group, a client may be a fast food company, an automobile dealer ship, or insurance agents. As individuals, a client may, for instance, be a specific fast food company, a specific automobile dealer ship, or a specific insurance agent.

The market value may be determined by, for instance, creating a list of criteria that may be significant to a client. This requested list of criteria may, for instance, be obtained by a method such as, but not limited to, polling one or more representative clients, observing attributes that are present in their existing advertising or marketing, or some combination thereof.

The viable-clips may then have their virtual insertion related attributes 160 compared to the attributes on such a requested, or desirable, list of criteria, and scored according to the degree of overlap between the requested list of criteria and the actual virtual insertion related attributes 160. This comparison may be converted to a single number that may be considered to be a market value 210 for that viable-clip or group of viable-clips. By then comparing actual sales of insertion opportunities in viable-clips and their values of that single number, a dollar amount may be attached to the market value 210.

Figure 7:
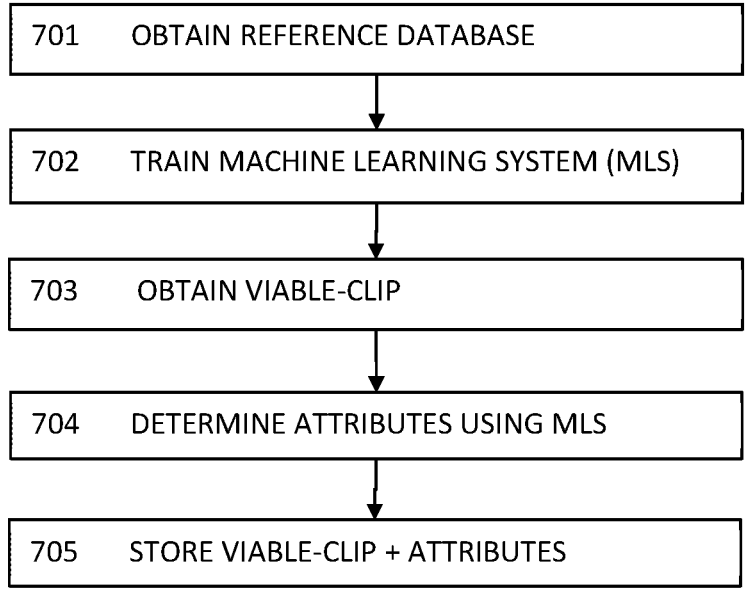
FIG. 7 shows a schematic flow-diagram of representative steps in automatically obtaining virtual insertion related attributes of a viable-clip of one embodiment of the present invention.

FIG. 7 shows a schematic flow-diagram of representative steps in automatically obtaining virtual insertion related attributes of a viable-clip of one embodiment of the present invention.

Although the viable-clips may be categorized into any of the virtual insertion related attributes 160 described above by means of a human, for efficiency it may be desirable to perform some, or all, of that categorization automatically. The tools of artificial intelligence are sufficiently developed to perform such categorization with sufficient accuracy for commercial purposes.

Artificial intelligence mat be defined as the capability of a machine to imitate intelligent human behavior. A subset of artificial intelligence is machine learning, which may be defined as the science of getting computers to act in specific ways without explicitly programming them to do so. This allows the development and implementation of algorithms that can quickly and efficiently recognize patterns. Deep learning is a form of machine learning that uses dozens, or even hundreds, of layers of neural networks to automatically classify information.

A combination of developments in both computer hardware and software have made both machine learning and deep learning techniques available that may now be readily applied to the classification tasks necessary to implement the present invention. For instance, the NVIDIA Corporation of Santa Clara, Calif., has developed digital image processors, termed graphic processing units (GPUs) that are capable of performing the required intense computation within reasonable times. The MathWorks Inc. of Natick, Mass., has developed software platforms under the name of MATLAB™ that may be used to implement classifiers such as, but not limited to, support vector machines, that may be used to perform the classifications to the accuracy required to implement the inventive concepts of the present invention. Within MATLAB™ there is, for instance, a software package of Flexible Algorithms for Image Registration (FAIR) that may be used in implementing suitable machine learning systems. There are also opens source programs such as, but not limited to, Torch. Torch is a scientific computing framework with wide support for machine learning algorithms that may run on Graphic Processor Units (GPUs), such as those supplied by the NVIDA corporation. There are also commercially available training sets such as, but not limited to, the COCO (Common Objects in COtext) dataset. COCO is a dataset supplied by the Microsoft Corporation of Redmond, Wash., that contains 2,500,000 labeled instances of 91 common object categories in 328,000 images. These resources may aid in the implementation of the present invention.

FIG. 7 shows an exemplary method of using such hardware and software to automatically obtaining the virtual insertion related attributes of a viable-clip of one embodiment of the present invention.

In Step 701 "OBTAIN REFERENCE DATABASE", a human reviews and classifies the viable-clips into the required categories and stores them in a reference, or training, database.

The required categories may be any of the virtual insertion related attributes described above such as, but not limited to, a scene context, a representative object, an emotional tone, or a contained character, or some combination thereof. The databases may include the audio track associated with the viable-clip.

In Step 702 "TRAIN MACHINE LEARNING SYSTEM (MLS)", the machine learning system may be trained on the reference, human classified, database. The machine learning system may, for instance, be a MATLAB™ software program implemented on NVIDIA hardware, and may, for instance, instantiate systems such as, but not limited to, support vector machines running classifiers such as, but not limited to, linear or non-linear classifiers. Other deep learning systems such as, but not limited to, convolutional neural networks may be employed to aid, or replace elements, of such programs. Such trained machine learning systems may then classify further instances of data with an accuracy that may be as high as 90% correct.

Training machine learning systems may be the most resource intense aspect of using them. However, transfer learning may be used to reduce this burden. In transfer learning, a deep learning system trained at considerable expense of resources, may be adjusted to perform a new, but analogous, task with minimal training on smaller training data sets. A fully trained machine learning system, originally trained to recognize a particular set of images, such as, but not limited to, images seen by a self-driving vehicle, may, for instance, be adjusted via transfer learning to recognize some required set of virtual insertion related attributes with a relatively modest about of further training data and training time.

In Step 703 "OBTAIN VIABLE-CLIP", one or more viable-clips may be obtained from a viable-clip database and supplied to the machine learning system.

In Step 704 "DETERMINE ATTRIBUTES USING MLS", the machine learning system may use the training obtained in Step 702, to now classify the viable-clip into one or more or the required virtual insertion related attribute classifications.

In Step 705 "STORE VIABLE-CLIP + ATTRIBUTES", the assessed viable-clip may then be stored along with the relevant details of attributes associated with it.

Figure 8:
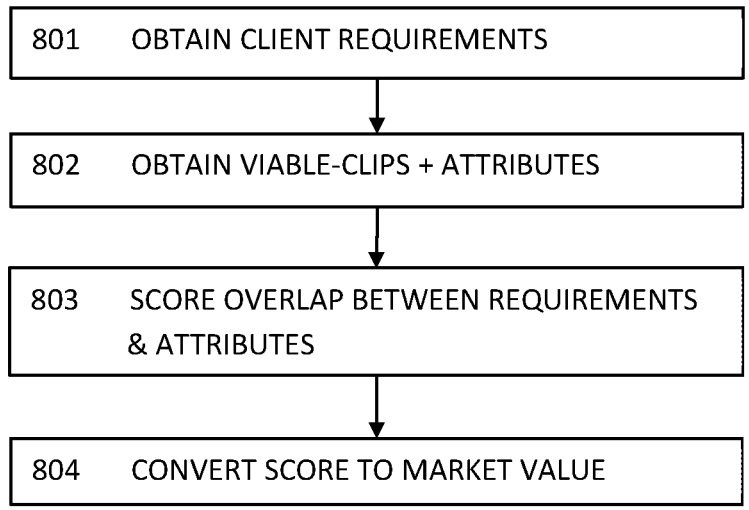
FIG. 8 shows a schematic flow-diagram of representative steps in automatically obtaining a value of a viable-clip of one embodiment of the present invention.

FIG. 8 shows a schematic flow-diagram of representative steps in automatically obtaining a value of a viable-clip of one embodiment of the present invention.

In Step 801 "OBTAIN CLIENT REQUIREMENTS" a list of desirable virtual insertion related attributes may be obtained. The list may include items such as, but not limited to, the area, duration, and one or more other virtual insertion related attributes that may be desirable in any viable insertion regions of a viable clip. The desired virtual insertion related attributes may also be assigned a numerical weight that may be reflective of their value to a client.

In Step 802 "OBTAIN VIABLE-CLIPS + ATTRIBUTES", the virtual-clips and their associated virtual insertion related attributes may be obtained from, for instance, a virtual-clip database.

In Step 803 "SCORE OVERLAP BETWEEN REQUIREMENTS & ATTRIBUTES, a program operating on a digital processor may automatically compare the virtual-clips associated virtual insertion related attributes with the client requested list of criteria. The scoring may take a form such as, but not limited to, weighting a viable-clips potential value by any overlap between a desired attribute and a possessed attribute, with the weighting being a number greater than one. This score may be reduced to a single number.

In Step 804 "CONVERT SCORE TO MARKET VALUE", the score may be converted to a market value, which may be a dollar value that may be representative of an offer for sale of the use of the clip for virtual insertion. This dollar value may, for instance, be determined by comparison of past sales of comparably scored viable-clips.

Although this invention has been described with a certain degree of particularity, it is to be understood that the present disclosure has been made only by way of illustration and that numerous changes in the details of construction and arrangement of parts may be resorted to without departing from the spirit and the scope of the invention.

The invention claimed is:

1. A system for the augmented assessment of digital media streams for virtual image insertion opportunities, comprising:

a digital media stream comprising one or more digital video images;

a candidate-clip database comprising a digital data storage unit;

processing said digital media stream using a programmed, digital computation device to automatically obtain one or more candidate-clips, said candidate-clip comprising a contiguous portion of said digital media stream having a duration of at least 30 of said digital video images, and no internal shot transitions, wherein, said shot transition comprises a change of 5% or more in a sum of image pixel values between consecutive digital video images; and storing said candidate-clips in said candidate-clip database.

2. The system of claim 1, further comprising, processing one or more of said candidate-clips using said programmed, digital computation device to automatically obtain one or more viable-clips, said viable-clip comprising said candidate-clip comprising a viable insertion region; and storing said viable-clips, tagged with coordinates indicative of a geometric location of said viable insertion regions, in a viable-clip database.

3. The system of claim 2, wherein, said viable insertion region comprises a contiguous region of a one of said digital video images of said viable clip in which all pixels have pixel color values within a predetermined range of color values, said contiguous region being greater than a predetermined minimum area.

4. The system of claim 3, wherein, said predetermined range of color values is less than or equal to +/−1% of a mean color value of said pixels, and said predetermined minimum size is an area that is greater than or equal to 5% of a total area of said digital video image.

5. The system of claim 2, wherein said viable insertion region comprises a contiguous region, unoccluded by foreground objects, of a one of said digital video images of said viable clip that is rectangular in shape, has an area greater that than 5% of the total area of the clip image, and in which the rectangle has an aspect ratio less than 4:1.

6. The system of claim 3, further comprising automatically determining one or more virtual insertion related attributes of one of said viable-clips.

7. The system of claim 6, wherein said virtual insertion related attribute is a perspective perceived, surface orientation, and wherein, automatically determining said perspective perceived, surface orientation further comprises,
automatically obtaining one or more edges of said viable insertion region;
automatically using said detected edges to define a perspective perceived, plane of said viable insertion region; and
automatically using said of said perspective perceived, plane to define a normal vector, normal to said perspective perceived, plane.

8. The system of claim 6, wherein, said insertion related attribute is a scene context, and, wherein, automatically determining said scene context of said viable-clip comprises:
a reference database of human evaluated training video images representative of one or more scene contexts;
training a machine learning system on said reference database; and
using said trained machine learning system to determine a scene context of one or more of said viable-clips.

9. The system of claim 8, wherein said reference database further comprises a representative object database of images of objects representative of one or more scene contexts; and, wherein, said trained machine learning system processes one or more digital images of said viable-clips to identify one or more representative objects present in said digital image; and, wherein, said programmed, digital computation device uses one or more of said identified representative objects to determine said scene context.

10. The system of claim 9, wherein, said scene context is one of a living room scene, a kitchen scene, a bathroom scene, a bedroom scene, an office scene, a restaurant scene, and a bar scene.

11. The system of claim 6, wherein, said insertion related attribute is an emotional tone, and, wherein, automatically determining said emotional tone of said viable-clip comprises:
an audio track associated with said viable-clip;
a reference audio database of human evaluated training audio tracks representative of one or more emotional tones;
training a machine learning system on said reference audio database; and
using said trained machine learning system to determine said emotional tone of one or more of said viable-clips.

12. The system of claim 11 wherein said emotional tone is one of a high intensity moment, a suspenseful moment, a surprising moment, a fearful moment, a cathartic moment, a joyful moment, and a sad moment, or some combination thereof.

13. The system of claim 6, wherein, said insertion related attribute is a contained character, and, wherein, automatically determining said contained character of said viable-clip comprises:
an audio track associated with said viable-clip;
a reference audio database of human evaluated training audio tracks representative of one or more contained characters;
training a machine learning system on said reference audio database; and
using said trained machine learning system to determine said contained character of one or more of said viable-clips.

14. The system of claim 6; further comprising:
automatically determining a potential value one of said viable-clips; and wherein, determining said potential value comprises:
automatically determining an area, a duration, and one or more of said virtual insertion related attributes of said viable insertion regions in said viable clip;
automatically assigning a numerical weight to each of said virtual insertion related attributes associated with said viable-clip; and
assigning a single numerical potential value to said viable clip based on a combination of said area, said duration, and said numerical weights of said virtual insertion related attributes.

15. The system of claim 14, wherein, said virtual insertion related attributes comprise one of a scene context, a perspective perceived surface orientation, an emotional tone, and a contained character, or some combination thereof.

16. The system of claim 14, further comprising, automatically determining a market value of said viable-clip, said market value comprising a numerical value reflective of correspondence between a client requested list of criteria and a said size, said duration and said virtual insertion related attributes of said viable clip.

* * * * *